United States Patent [19]

Kobayashi et al.

[11] Patent Number: 4,812,667
[45] Date of Patent: Mar. 14, 1989

[54] PAST RECORD CORRECTING/READING APPARATUS

[75] Inventors: Kazuo Kobayashi, Suginami; Mitsuo Togashi, Kawasaki; Satoshi Fukuda, Koganei, all of Japan

[73] Assignee: Matsushita Graphic Communication Systems, Inc., Meguro, Japan

[21] Appl. No.: 920,795

[22] Filed: Oct. 20, 1986

[30] Foreign Application Priority Data

Oct. 18, 1985 [JP] Japan ................................ 60-233769
Oct. 24, 1985 [JP] Japan ................................ 60-238050

[51] Int. Cl.4 .......................... H01J 40/14; H04N 1/40
[52] U.S. Cl. ..................................... 250/578; 358/282
[58] Field of Search ................... 358/213.19, 282, 283, 358/213.26, 213.27; 250/578, 211 J, 211 R

[56] References Cited

U.S. PATENT DOCUMENTS

| 4,264,932 | 4/1981 | Minamibayashi | 358/283 |
| 4,453,268 | 1/1984 | Britt | 358/282 |
| 4,672,682 | 1/1987 | Naruse et al. | 358/282 |

Primary Examiner—David C. Nelms
Assistant Examiner—Michael Messinger
Attorney, Agent, or Firm—Wenderoth, Lind & Ponack

[57] ABSTRACT

A past record correcting/reading apparatus comprises storage circuit means for storing photoelectric conversion information (image information) of the respective photosensitive elements corresponding to scanning lines during the past scanning operation; and level control means for controlling quantizing-levels or output levels of photoelectric conversion output signals derived from the respective photosensitive elements during the present scanning operation, based upon the past image formation read out from the storage circuit means.

17 Claims, 12 Drawing Sheets

ENCODER TABLE

| a>b | a=b | a<b | C3 | C2 | C1 | C0 | slice level |
|---|---|---|---|---|---|---|---|
| 1 | 0 | 0 | 0 | 1 | 0 | 1 | 5 |
| 0 | 1 | 0 | 1 | 0 | 0 | 0 | 8 |
| 0 | 0 | 1 | 1 | 0 | 1 | 1 | 11 |

F I G. 7
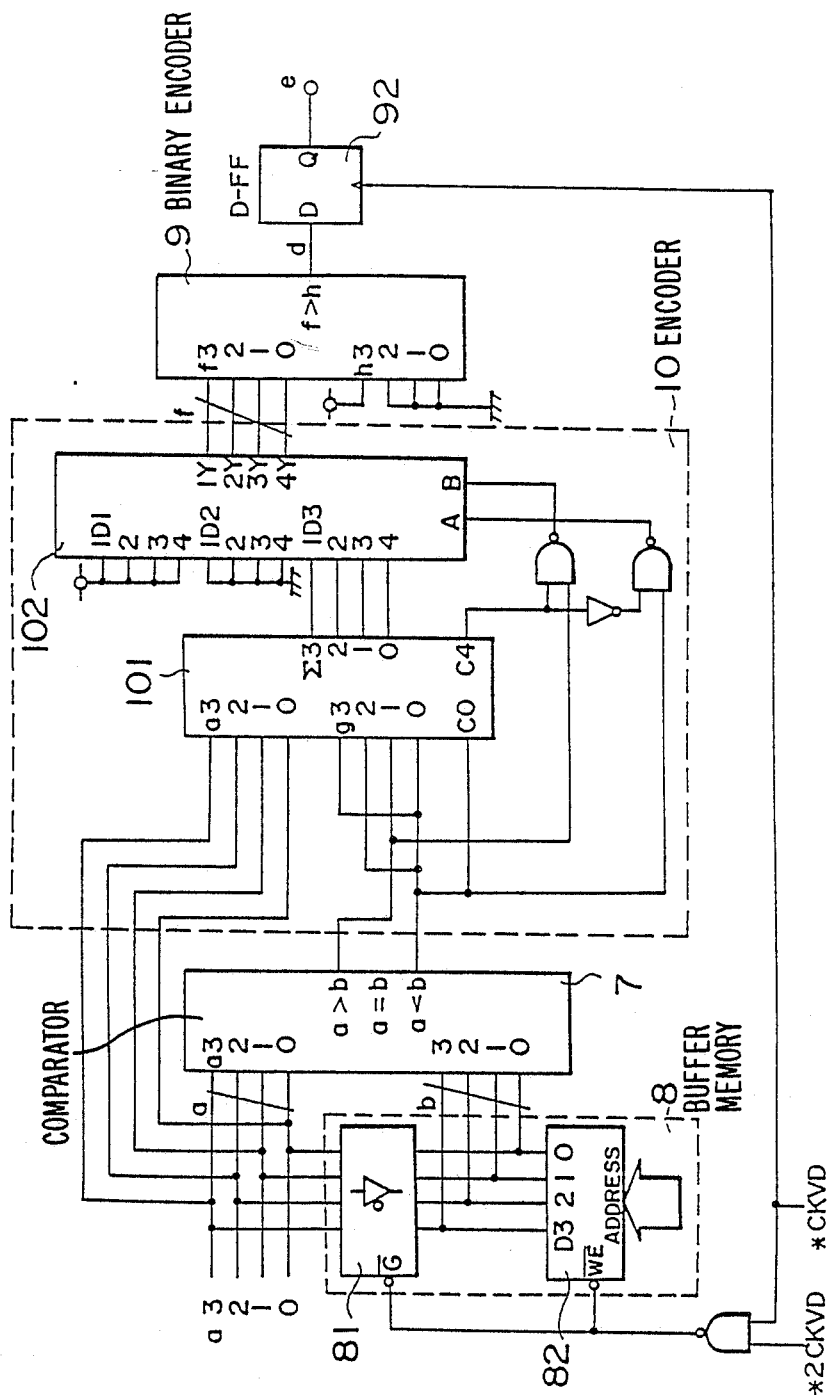

PAST RECORD CORRECTING/READING APPARATUS

BACKGROUND OF THE INVENTION

1. Field of the Invention

The present invention generally relates to a reading apparatus employed in facsimile systems. More specifically, the invention relates to past record correcting/reading apparatus in which an image sensor is employed to produce photoelectric conversion outputs and the photoelectric conversion outputs are converted into signals in accordance with transmission systems.

2. Description of the Related Art

In general, the reading apparatus as described in the preamble is arranged by an image sensor, an amplifier, a comparator, a lens, a light source and so on. In the reading apparatus, an original document is illuminated by light coming from the light source, and then the light reflected from the original document is focused via the lens onto the image sensor. A single array, or a plurality of arrays of so-called "photosensitive elements" are arranged in a line form along a main scanning direction. The photosensitive elements have such characteristics that electromotive power, resistance, and charged electrons vary with the amount of light incident thereon. The main scanning of the image sensor is accomplished by sequentially, electronically switching the photoelectric conversion signal of the respective photosensitive elements and successively deriving them therefrom. The sub-scanning of the image sensor is performed by relatively transporting the original document, lens, or image sensor by way of mechanical means or optical means.

The photoelectric conversion signals from the image sensor are conducted to the amplifier to be amplified. The amplified signals are derived from the amplifier as photoelectric conversion outputs Vs.

The processing mode for these photoelectric conversion outputs Vs varies in accordance with the transmission systems of the facsimile signals, i.e., analog transmission systems, or digital transmission systems. In case of analog transmission system, the photoelectric conversion outputs Vs may be directly conducted to a modulator for transmission purposes, whereas in the event of digital transmission system, they may be quantized via an analog-to-digital (A/D) converter and if necessary, further be coded for transmission purposes. That is to say, according to the A/D conversion of the digital transmission system, the photoelectric conversion outputs Vs are binary-quantized, based upon a reference voltage $V_R$ (slice level) of a comparator, into binary-coded signals that are derived from the output terminals as output signals of the A/D converter, assuming that photoelectric conversion outputs are indicated by Vs.

A description will now be made of the A/D conversion in more detail.

When slow photo-response image sensors such as CdS (cadmium sulfide) image sensors are employed as the image sensor, rising and falling portions of the photoelectric conversion outputs Vs represent gentle curves. Accordingly, assuming that the scanning time period is equal to $\tau$, either the rise time, or fall time must be shorter than, or equal to the scanning time period. Then, since the rise and fall times are substantially equal to $\tau$, the binary quantization is performed by fixing the slice level to approximately 50% (percents) of the photoelectric converted output voltage.

In the conventional reading apparatus, the scanning time period $\tau$ is selected to be longer than the rise time, or the fall time of the photoelectric conversion output, and the binary-quantized signal is obtained by the above-described means with maintaining substantially completely the original image information.

The conventional reading apparatus has, however, disadvantage that resolution in the sub-scanning direction is deteriorated, an image quality is deteriorated, and a limitation is provided with the scanning speed due to the previous reasons, even if such conventional means is utilized. This is because a longer time is required when the output of the image sensor reaches the photoelectric conversion output level determined by the reflections of the original document, due to the slow photo-response characteristic of the image sensor. The deteriorations of both the resolution and image quality are emphasized particularly in the high speed scanning. For instance, if the scanning rate is twice as the above scanning rate, i.e., the scanning time period being $\tau/2$, the rising and falling characteristics of the photoelectric conversion output with respect to the image information are considerably deteriorated, as compared with the scanning time period of $\tau$. As a result, the photoelectric conversion outputs concerning small image signals do not exceed the slice level, so that the image information for the small image signals will be lost. The waveform of the resultant binary-coded output signal is very different from that of the original image information, resulting in serious deteriorations of the image resolution and quality.

It is apparent that the higher the scanning rate increases, the more the small signal portions are lost. In other words, there is a limitation in the scanning rate. Consequently, it should be understood that no binary-quantized signal output analogous to the original image information is obtained unless the image scanning is implemented at a constant scanning time period longer than the rise and fall times of the employed image sensor.

BRIEF SUMMARY OF THE INVENTION

The present invention is made in consideration of the above-described circumstances and has therefore an object to provide a reading apparatus in which the resolution in the sub-scanning direction as well as the image quality are not harmed and the higher scanning rate can be realized even if the image sensor having slower photo-response characteristics is employed.

A detailed object of the present invention is to provide a past record correcting/reading apparatus wherein either quantized levels or output levels of photoelectric-converted output signals derived from the respective photosensitive elements by the present scanning lines are controlled based upon the information obtained by the past scanning lines.

BRIEF DESCRIPTION OF THE DRAWINGS

These and other objects and advantages of the invention will be better understood from the following specification considered in connection with the accompanying drawings, in which:

FIG. 7 is a circuit diagram illustrating in detail a major portion of the apparatus shown in FIG. 6;

DETAILED DESCRIPTION OF PREFERRED EMBODIMENT

ARRANGEMENT OF FIRST READING APPARATUS

Figure 1:
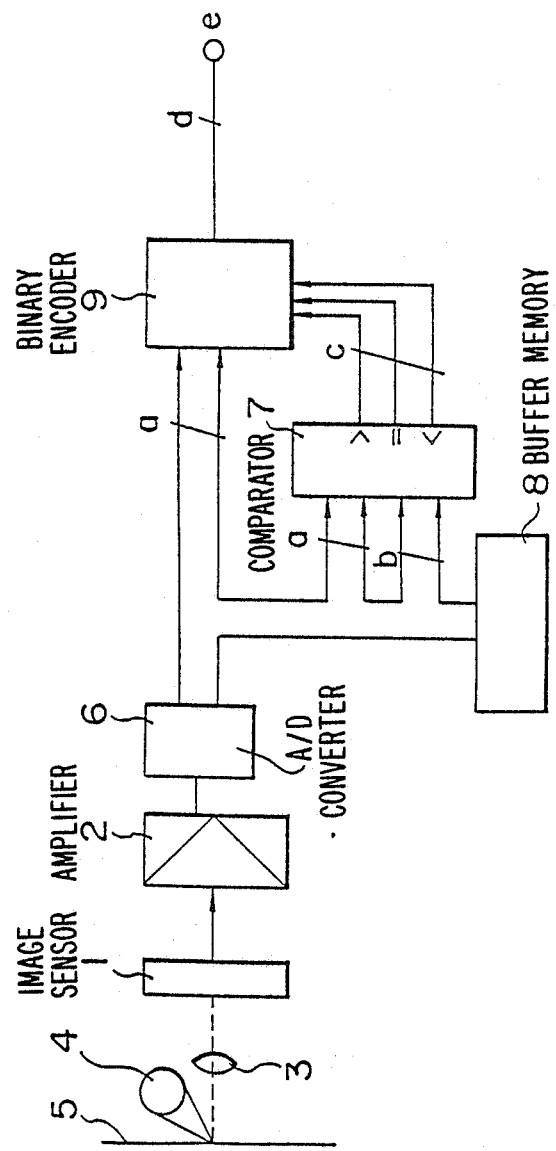
FIG. 1 is a schematic block diagram of a past record correcting/reading apparatus according to one preferred embodiment of the invention.

Referring now to FIG. 1, the best mode of the invention will be described.

FIG. 1 is a schematic block diagram of a past record correcting/recording apparatus according to the invention. The apparatus includes an image sensor 1, an amplifier 2, a lens 3, a light source 4 and an original document 5 and so on. The original document 5 is illuminated by the light source 4 and then, the light reflected from the document 5 is focused via the lens 3 onto the image sensor 1. Reference numeral 6 indicates an analog-to-digital (A/D) converter for converting the analog information from the amplifier 2 into the corresponding digital information. Reference numeral 7 denotes a comparator for comparing photoelectric conversion information "a" of the respective photosensitive elements of the image sensor 1, which was previously obtained during the past scanning operation and corresponds to the past scanning lines, with photoelectric conversion information "b" of the respective photosensitive elements, which is presently obtained during the present scanning operation so as to judge which information is greater than the remaining information. The former information is referred to as "past scanning line information", whereas the later information is referred to as "present scanning line information". Reference numeral 8 represents a buffer memory circuit (referred to as a "storage circuit") for storing the past scanning line information "b". Reference numeral 9 is a binary encoder for binary-judging the present scanning line information "a", based upon the comparison judgement output signal "c" (simply referred to as a "judgement output signal") derived from the comparator 7 and for deriving a binary-quantized output signal (referred to as a "binary output signal") at its output terminal "e".

SLICE LEVEL DETERMINATION

Figure 2:
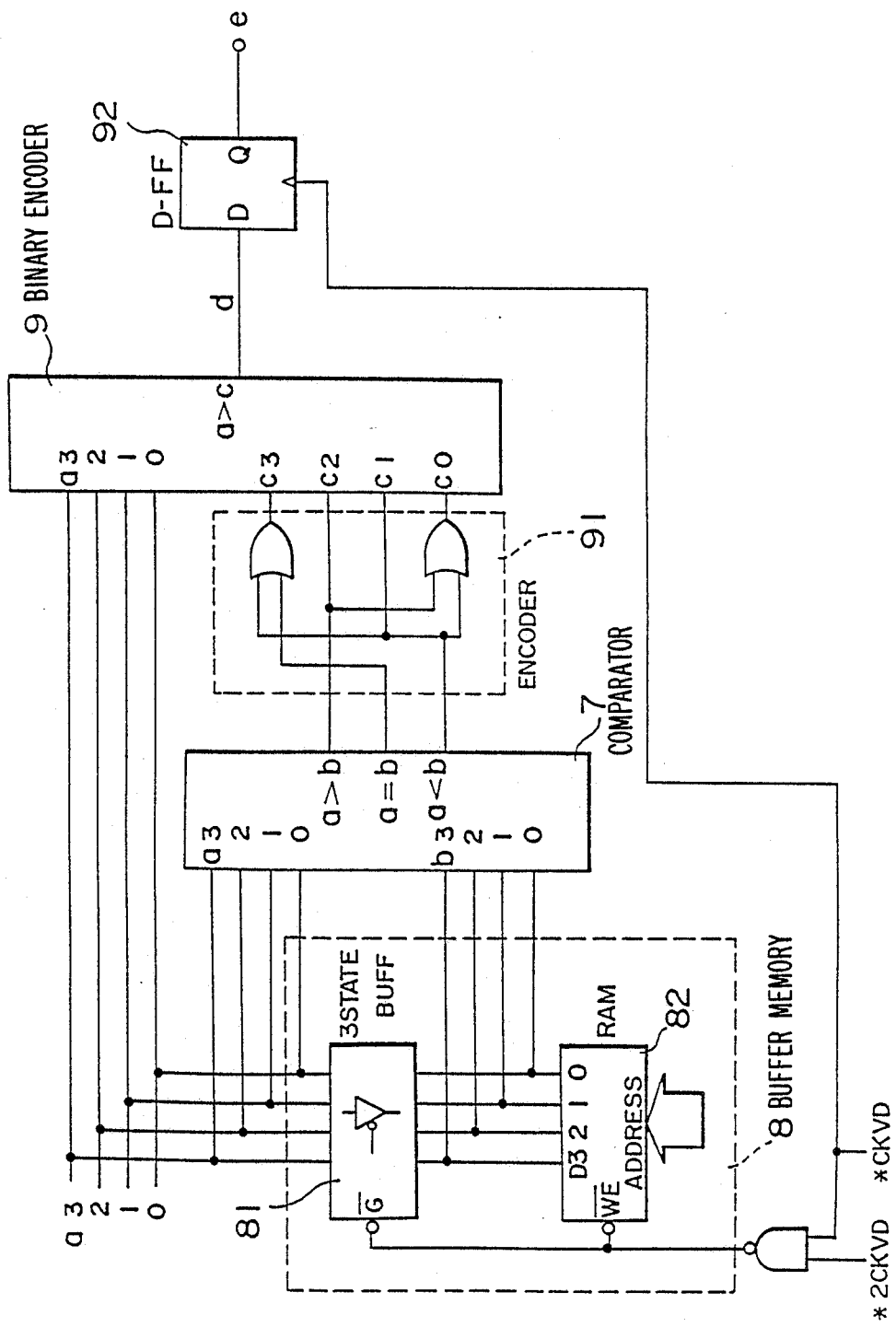
FIG. 2 is a circuit diagram showing in detail a major part of the apparatus shown in FIG. 1.

Referring to FIG. 2, a description will now be made of operations of the circuit shown in FIG. 1. That is to say, FIG. 2 is a circuit diagram of the major circuit elements shown in FIG. 1, i.e., the comparator 7, the storage circuit 8 and the binary encoder 9.

It should be noted that the scanning line information is a 4-bit input in the embodiment shown in FIG. 2.

The light reflected from the original document 5 illumited by the light source 4 is photoelectric-converted via the lens by the image sensor 1 (for instance, a CdS (cadmium sulfide) image sensor). The photoelectric-converted signal is amplified in the amplifier 2 and thereafter A/D-converted in the A/D converter 6 into digital signals $a_0$ to $a_3$ (i.e., the present scanning line information).

Then, the digitized present scanning line information $a_0$ to $a_3$ is supplied to the binary encoder 9 and simultaneously to the comparator 7. The present scanning line information $a_0$ to $a_3$ is, on the other hand, written into predetermined addresses of a RAM (random access memory) 82 via a three-state buffer 81. The present scanning line information $a_0$ to $a_3$ written in this RAM 82 is read out as the past scanning line information $b_0$ to $b_3$ when the succeeding scanning line information is stored therein.

Figures 3, 4:
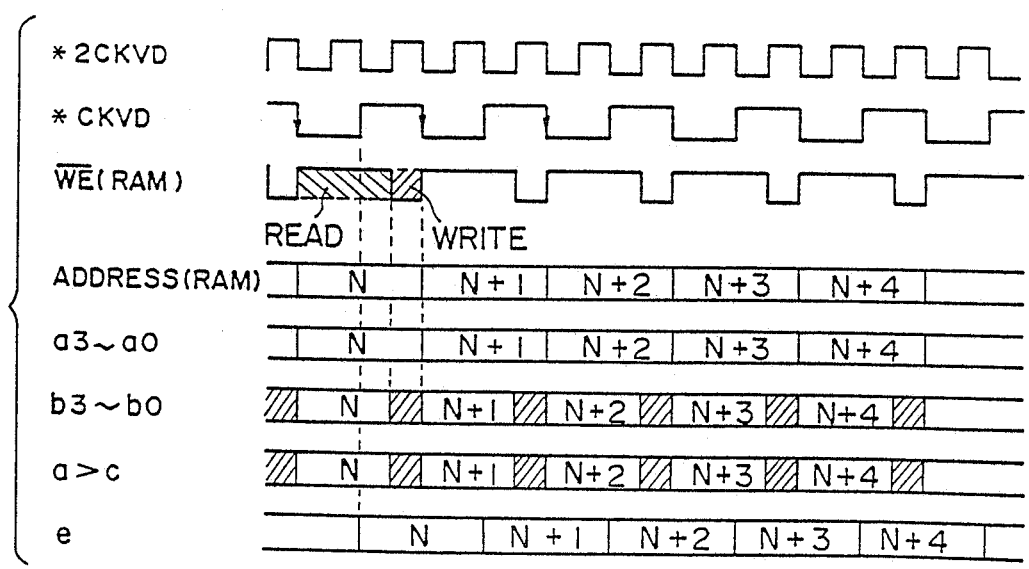
FIG. 3 is an encoder table for the circuit shown in FIG. 2.
FIG. 4 is a timing chart of various operations in the circuit shown in FIG. 2.

It should be noted that both the writing operation of the present scanning line information $a_0$ to $a_3$ and the reading operation of the past scanning line information $b_0$ to $b_3$ are performed under control of an enable signal $\overline{WE}$, as shown in the timing chart of FIG. 4. That is to say, upon input of the present scanning line information $a_0$ to $a_3$ into the RAM 82, the past scanning line information $b_0$ to $b_3$ is simultaneously read out from the RAM 82 and supplied to the comparator 7.

Thus, the comparator 7 makes a comparison between the above-described image information "a" and "b" in accordance with the preset conditions as shown in Table 1, and delivers judgement output signals $C_0$ to $C_3$ as comparison results to the binary encoder 9. In other words, values of these judgement output signals $C_0$ to $C_3$ vary with the comparison results between both the image information "a" and "b", and therefore determine the slice level of the binary encoder 9.

TABLE 1

| present scanning line information "a" | | past scanning line information "b" | slice level "c" |
|---|---|---|---|
| a | < | b | 69% |
| a | = | b | 50% |
| a | > | b | 31% |

If the present information "a" is greater than the past information "b", the judgement output signals $C_0$ to $C_3$ of an output (0101) are derived from the encoder 91 as illustrated in the encoder table of FIG. 3. Furthermore, if the present information "a" is equal to the past information "b", the encoder 91 derives an output (1000) therefrom. If the present information "a" is smaller than the past information "b", an output (1011!) is provided from the encoder 91. Accordingly, the slice levels of the binary encoder 9 are determined in such a manner that with respect to the output range from 0 to 15, the slice levels "5", "8" and "11" are in the event of a>b; a=b; a<b, respectively.

Then, the resultant judgement output signals (i.e., slice levels) $C_0$ to $C_3$ determined in the above way are used in the binary encoder 9 as the binary-quantizing levels. Namely, the present information $a_0$ to $a_3$ is binary-quantized and thereafter only binary image information is derived from a terminal "e" of a D type flip-flop 92 as shown in FIG. 4.

In brief, according to the present embodiment, the slice levels (i.e., the judgement output signals "C") which are successively determined by comparing the magnitude of the present scanning line information "a" to that of the past scanning line information "b", are utilized as the binary-quantizing levels for the present scanning information "a".

PRODUCTION OF CORRECTED BINARY OUTPUT

Figure 5:
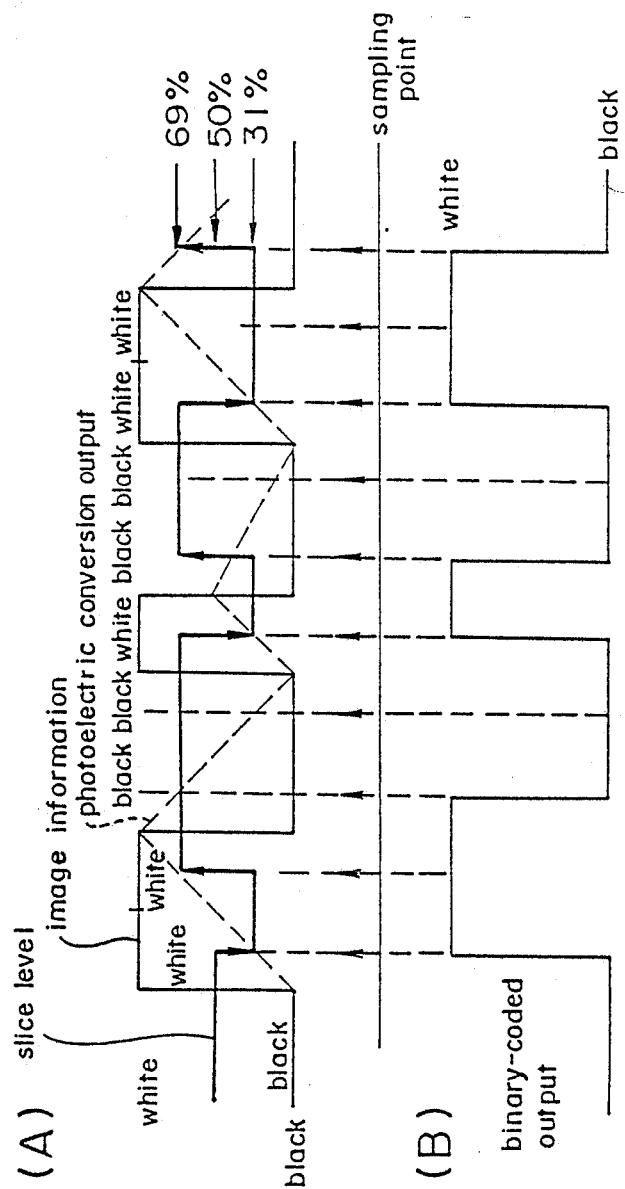
FIGS. 5A and 5B show waveform diagrams for explaining operations of the circuit shown in FIG. 1.

In FIGS. 5A and 5B, there are shown waveforms for representing a relationship between the image information variations and the corresponding photoelectric-converted output signals which are obtained from the specific photosensitive element along the sub-scanning direction. Sampling points for determining the binary quantization are located at the dotted lines of the drawing.

As easily understood from FIGS. 5A and 5B, since the slice level follows the image information while changing its value, or magnitude (69%, 50%, 31%) at the sampling points, the original image information can be precisely reproduced from the binary-quantized output signal even if the higher scanning rate is executed (see FIG. 5B).

While the best mode embodiment has been described, other preferred embodiments of the invention will now be explained in detail.

ARRANGEMENT OF SECOND READING APPARATUS

Figure 6:
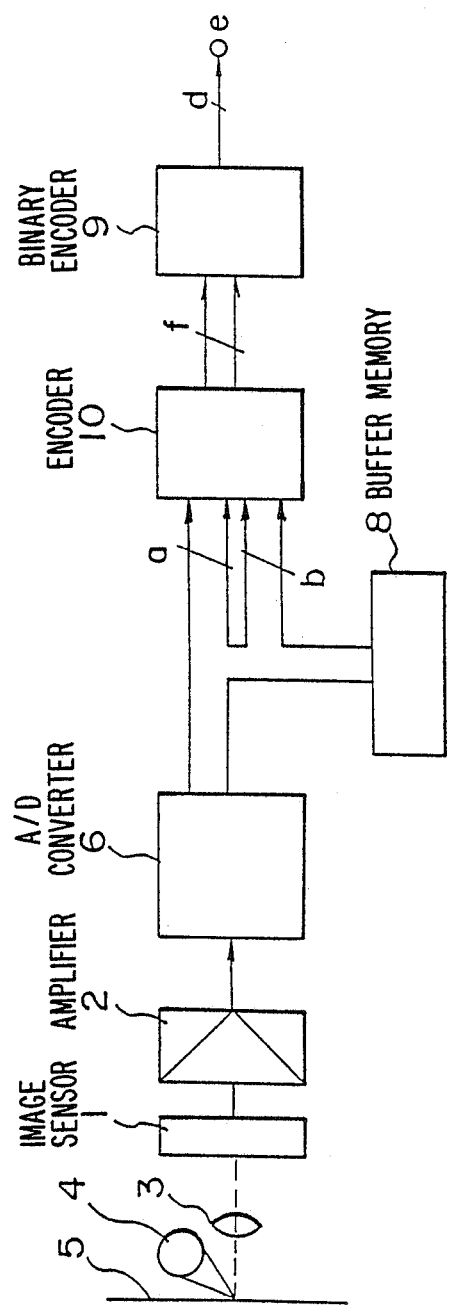
FIG. 6 is a schematic block diagram of a past record correcting/reading apparatus according to another preferred embodiment of the invention.

Referring now to FIG. 6, another past record correcting/reading apparatus will be described.

It should be noted that the same reference numerals employed in FIG. 1 will be used as those for denoting the same or similar circuit elements in the following figures.

In FIG. 6, reference numeral 10 indicates an encoder for comparing the present scanning line information "a" with the past scanning line information "b" and for producing corrected data "f" by weight-processing the present scanning line information "a".

In the preferred embodiment, under the condition that the slice level for the binary quantization of the binary-quantizing encoder 9 is kept constant, the present scanning information "a" is weight-processed, or weighted by utilizing the present and past scanning line information, and then, the weighted data (corrected data "f") is binary-quantized, or binary coded by the binary-quantizing encoder 9 having the above-defined constant slice level so as to produce the binary-quantized signal for precisely producing the original image information at its output terminal "e".

WEIGHTING PROCESS

In FIG. 7, a weighting process circuit is shown for weighting the present scanning line information "a", as one preferred embodiment. When the present scanning line information "a" is input in the storage circuit 8, the past scanning line information "b" is simultaneously read from this storage circuit 8, and input into the comparator 7. Also the present scanning line information "a" is input as a minuend into an adder 101. When the present information "a" is greater than the past information "b" (i.e., a>b), as a comparison result of the comparator 7, the adder 101 performs the addition of +2 at its output (Σ). When "a" is smaller than "b", the subtraction result of −2 is obtained at its output (Σ). It is apparent that if "a" is equal to "b", the present information "a" is directly output from the output (Σ) of the adder 101. Moreover, in case that "a" is greater than "b", the carry output $C_4$ of an L-level is supplied to the terminal "B" of the selector 102 when +2 is added to "a" and then its output becomes more than 16. Conversely, in case of a<b, the L-level is output to the terminal "A" of the selector 102 when −2 is subtracted from "a" and then its output becomes less than zero.

Figures 8, 9:
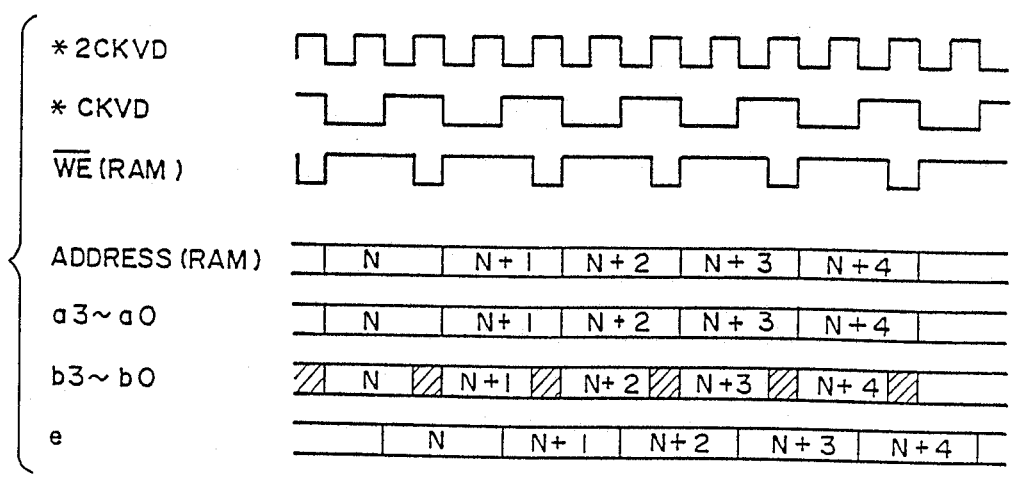
FIG. 8 shows a function table of the selector employed in the circuit of FIG. 6.
FIG. 9 is a timing chart of various operations in the circuit shown in FIG. 7.

Accordingly, the corrected data "f" can be obtained from the selector 102 in accordance with the function table shown in FIG. 8. Furthermore, the corrected data "f" is processed in the binary-quantizing encoder 9 by employing the fixed slice level "h" to derive at its output terminal "e" the desired binary-encoded signal. The circuit shown in FIG. 7 is driven in synchronism with the clock pulse CKVD as shown in the timing chart of FIG. 9.

Then, as shown in Table 2 described later, another embodiment may be conceived with respect to the previous embodiment of FIG. 6. That is to say, if a variation difference (a−b) between the present scanning line information "a" and the past scanning information "b" is equal to zero, or ±1, the present scanning line information "a" in question can be directly output as the corrected data "f". When the variation difference (a−b) becomes 2, the weighting process by adding +1 level to the present scanning line information "a" may be executed to output the resultant data as the corrected data "f".

In the binary-quantizing encoder 9, a decision is made whether the above corrected data "f" is greater or smaller than the slice level preset to a constant value of this encoder 9 so as to determine whether it corresponds to white "1" or black "0", resulting in the binary quantization of the corrected data "f".

Figure 10:
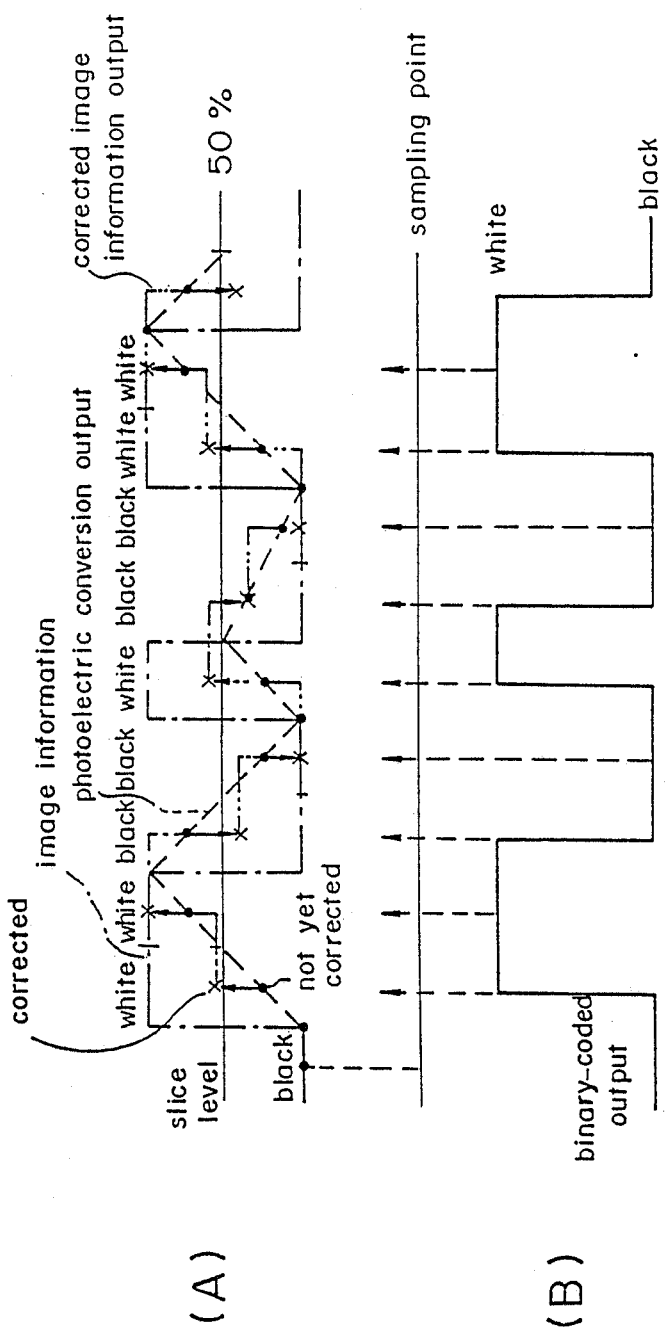
FIGS. 10A and 10B illustrate waveform diagrams for explaining operations of the circuit shown in FIG. 6.

Precisely speaking, if the weighting process of the present scanning line information is carried out in accordance with Table 2, the photoelectric conversion output shown in FIG. 5A becomes one shown in FIG. 10A. Even if the photoelectric conversion output has the constant slice level (50%), the binary-quantized output waveform can appear as shown in FIG. 10B.

TABLE 2

| a − b | f |
|---|---|
| 0, ±1 | a |
| 2 | a + 1 |
| −2 | a − 1 |
| 3~ | a + 1 |
| −3~−6 | a − 2 |
| −7~ | a − 3 |

It should be understood that in both FIGS. 10A and 10B, the two-dotted line denotes the weighted image information output, i.e., so-called "corrected image information data", cross points indicate sampling points for representing the values of the corrected data "f", and when the information has these values, then it is latched. Also, the black points represent the sampling points for determining the binary quantization before correction. When the above-described difference (a−b) varies within the range of zero, or ±1, the black points are superimposed with the cross points.

Since the output waveform shown in FIG. 10B is similar to that of FIG. 5B, the same advantage of the preferred embodiment shown in FIG. 1 can be achieved in this embodiment shown in FIG. 6.

THIRD READING APPARATUS

While the photoelectric conversion output Vs derived from the image sensor 1 has been binary-quantized through the A/D-converter in the previous embodiments, the direct binary-quantizing operation will now be described in the following preferred embodiments.

Figure 11:
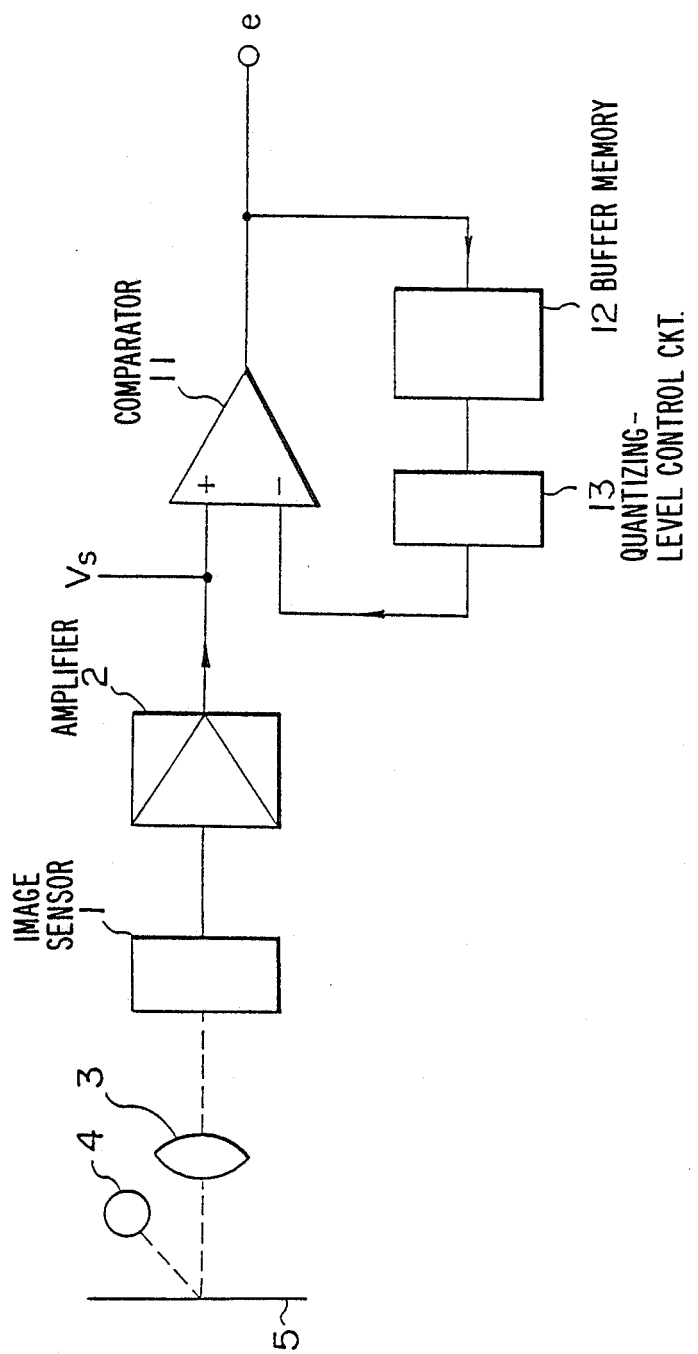
FIG. 11 is a schematic block diagram of an apparatus according to a further preferred embodiment of the invention.

Another preferred embodiment of a past record correcting/reading apparatus is shown in FIG. 11 as a schematic block diagram. In this apparatus, the past scanning line information is once stored in the storage circuit, and the binary-quantizing level is controlled by changing the slice level based upon the information stored in the storage circuit.

In FIG. 11, reference numeral 11 indicates a comparator for comparing the image information output with the slice level, and reference numeral 12 denotes a buffer memory circuit (simply referred to as a "storage circuit") for storing the photoelectric conversion information of the respective photosensitive elements corresponding to the scanning lines during the past scanning period (referred to as "past scanning line information"). Reference numeral 13 represents a quantizing-level control circuit for determining the quantizing-level based upon the past scanning line information.

QUANTIZING-LEVEL DETERMINATION

Operations of the circuit shown in FIG. 11 will now be described.

The light reflected from the original document 5 illuminated by the light source 4 is converted via the lens 3 by the image sensor 1 (e.g., a CdS image sensor) into photoelectric conversion output. The conversion output is amplified in the amplifier 2 and then transferred to the comparator 11. The comparated output is further binary-quantized. The resultant binary-quantized or binary-encoded signal appears at the output terminal "e" of the comparator 11.

Figure 12:
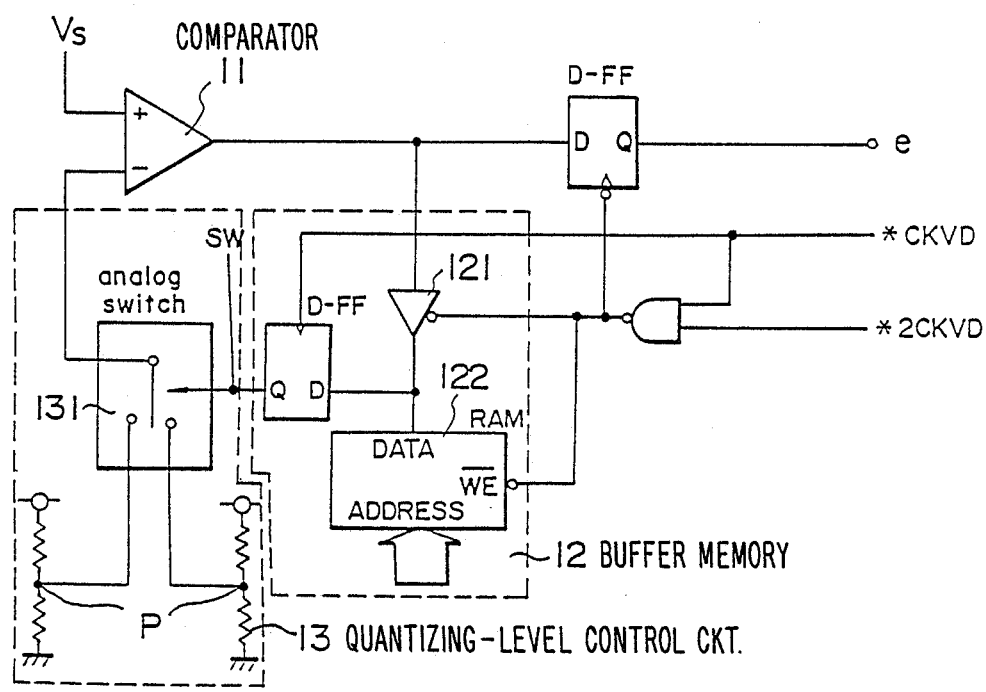
FIG. 12 is a circuit diagram for explaining operations of the major circuit portion shown in FIG. 11.
Figure 13:
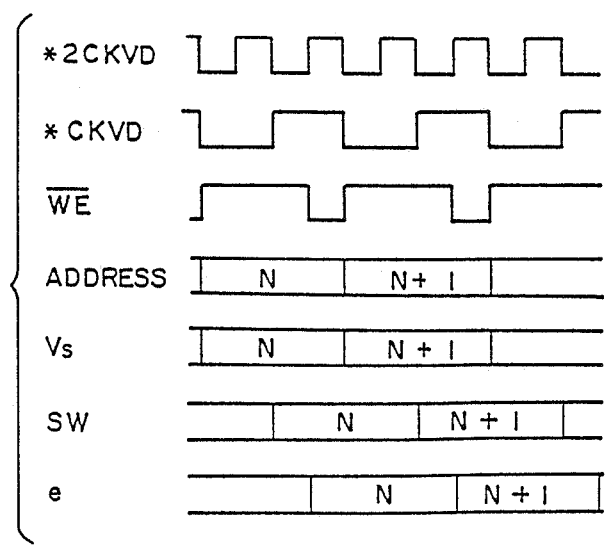
FIG. 13 is a timing chart of operations for the circuit shown in FIG. 12.

A major circuit portion of the circuit shown in FIG. 11 is shown in FIG. 12. The binary-quantized output signal obtained by the comparator 11 is simultaneously written via a three-state buffer 121 of the storage circuit 12 into predetermined addresses of the RAM 122, as the past scanning line information, under the timing control shown in FIG. 13. The above binary-quantized output signal is simultaneously stored as the past scanning line information into the storage circuit 12. The past scanning line information stored in this storage circuit 12 is read out when the succeeding scaning line information is input to the comparator 11. That is to say, when the photoelectric conversion output signal of the photosensitive element positioned in a predetermined position of the image sensor 1 is input into the positive (+) terminal of the comparator 11, the past scanning line information (referred to as "preceding scanning line information") is read from the RAM 122, and thereafter input into an analog switch 131 of the quantizing-level control circuit 13. Then, the voltage levels appearing at point P in response to the past scanning line information stored in the RAM 122 are switched by the analog switch 131. As a result, the outputs of the quantizing-level control circuit 13 are changed according to value shown in Table 3 in response to the content of white "1" or black "0" of the read preceding scanning line information.

TABLE 3

| past scanning line information | white (1) | black (0) |
|---|---|---|
| quantized-level | 0.25 | 0.75 |

In other words, when the past scanning line information is, for instance, white "1", the slice level of the comparator 11 is set to 25%, whereas when it is black "0", then the slice level is set to 75% so as to wait for the succeeding scanning line information because of the binary-quantization operation for the later information.

In brief, the slice level is forecasted based upon the preceding scanning line information and the forecasted slice level is used as the binary-quantizing level in the preferred embodiment.

Figure 14:
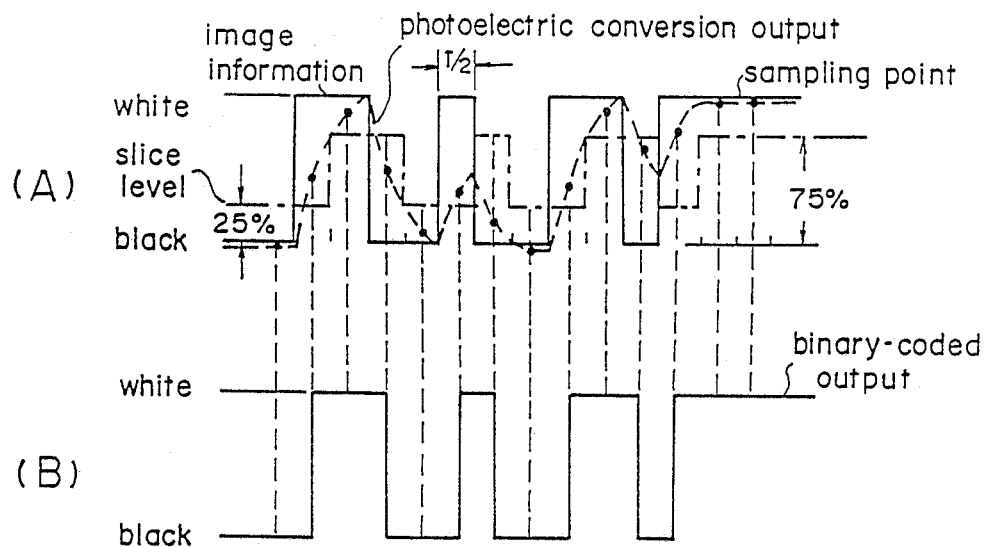
FIGS. 14A and 14B illustrate signal waveforms of the apparatus shown in FIG. 12.

FIGS. 14A and 14B are waveforms for explaining a relationship between the image information variations and the photoelectric conversion output derived from the specific photosensitive element in the sub-scanning direction. Among these figures, a dash-dotted line represents the slice level and black points are sampling points for determining the binary-quantizing operation.

As easily understood from the foregoing drawings, since the slice level is changed into either 25% or 75% with respect to the preceding scanning line information, the original image information can be correctly reproduced even if the higher scanning is performed according to the invention (see FIG. 14B).

FOURTH READING APPARATUS

Figure 15:
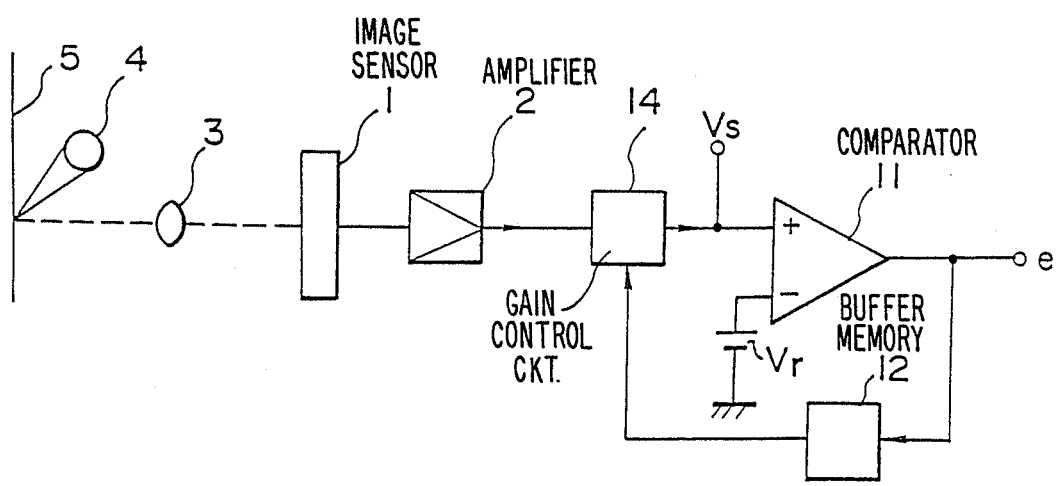
FIG. 15 is a schematic block diagram of an apparatus according to still another preferred embodiment of the invention.

Referring now to a schematic block diagram of FIG. 15, a description will be made of still another preferred embodiment. The same reference numerals shown in FIG. 11 are used for indicating the same or similar circuit elements of FIG. 15.

Reference numeral 14 indicates a gain control circuit for controlling the signal level of the photoelectric conversion output conducted to the comparator 11 in accordance with the past scanning line information. Alternatively, such a gain control function may be involved in the amplifier 2. A voltage Vr for determining the binary-quantizing level of the comparator 11 is kept constant.

That is to say, the gain of the photoelectric conversion and amplification system can be controlled by conducting the preceding scanning line information stored in the storage circuit 12 to the gain control circuit 14 with keeping the slice level of the comparator 11 constant in the preferred embodiment. Relatively changing the slice level by varying the image signal level enables the same advantage as in the preferred embodiment of FIG. 11 to be achieved.

In the preferred embodiment, the relative gain is controlled based upon the contents of the preceding scanning line information as listed in Table 4.

TABLE 4

| past scanning line information | white (1) | black (0) |
|---|---|---|
| relative gain | 2 | 2/3 |

When the preceding scanning line information (past scanning line information) is white "1", the amplified image signal is twice as high as the original image signal and the level of the image signal is increased. When it is black "0", the image signal is amplified by ⅔ times higher than the original image signal and the level of the image signal is decreased. In such a way, the image signal amplified by different amplification is conducted into the comparator 11 having a constant signal level to be binary-quantilized, so that the binary-quantilized signal is derived from the output terminal "e" of the comparator 11.

Figure 16:
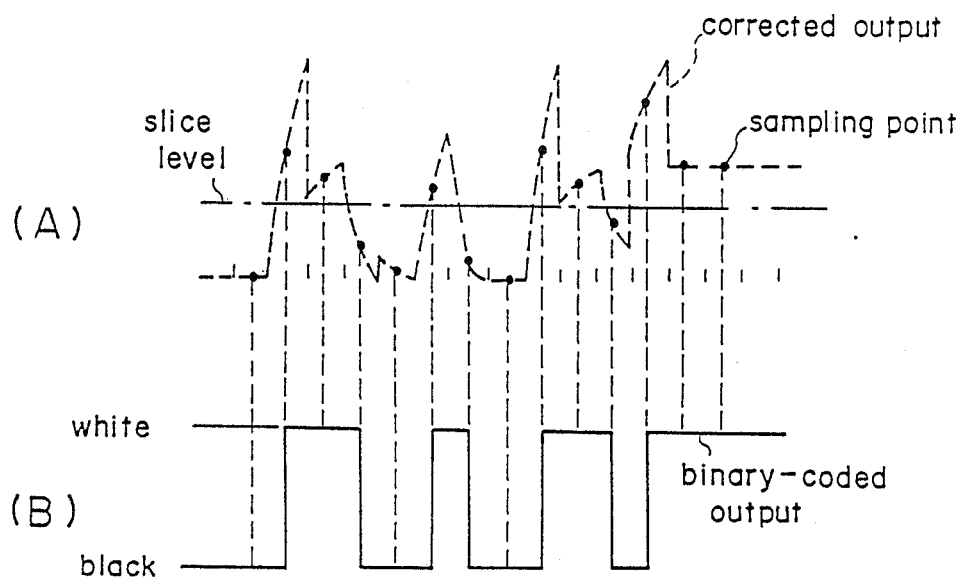
FIG. 16 is a waveform chart of signals produced in the apparatus shown in FIG. 15; and, FIG. 17 shows signal waveforms when the apparatus shown in FIG. 11 is operated.

Accordingly, the corrected signal of the circuit according to the preferred embodiment is obtained as shown in FIG. 16A, so that even if the slice level is set constant, the waveform of the binary-quantized signal as shown in FIG. 16A can be realized. Because this waveform is the same as the waveform shown in FIG. 14B, the same advantage as in the previous embodiment may be achieved.

MODIFICATIONS

In the previous embodiments, the scanning line information (preceding scanning line information) immediately before the present scanning line information only was used as the past scanning line information. It is however possible to employ as the past scanning line information the scanning line information (referred to as "past previous scanning line information") before this preceding scanning line information for the purposes of the high speed scanning as well as the scanning stability.

Figure 17:
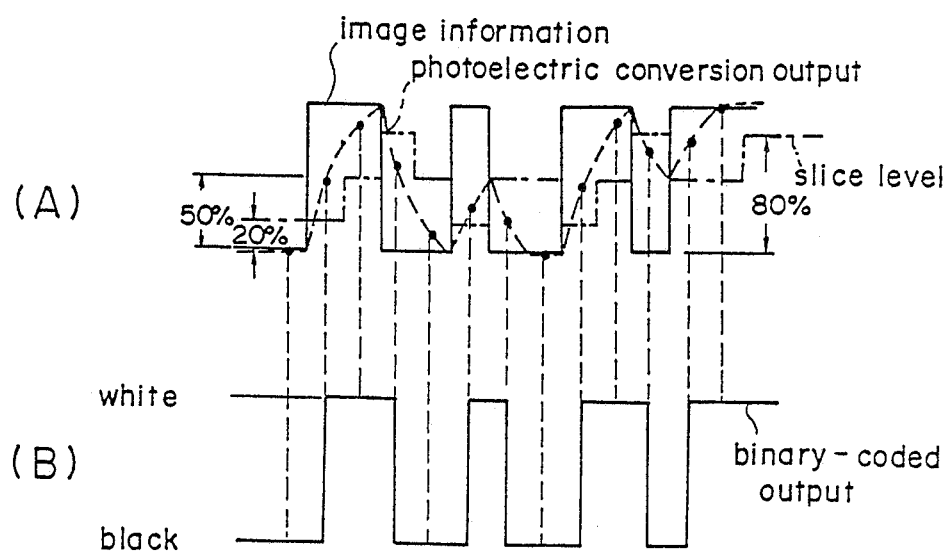

Referring now to FIG. 17, another preferred embodiment will be described in which the preceding scanning line information and the past previous scanning line information are utilized as the past scanning line information.

Although either binary-quantizing level, or relative gain, or both of them may be controlled to obtain the desired slice level, the binary-quantizing level (slice level) is varied as same as in the circuit arrangement shown in FIG. 11.

Therefore, no detailed description of the circuit arrangement is made here. It is however required to employ as the storage circuit 12 a storage circuit having a sufficient capacity capable of storing two sorts of the scanning line information, i.e., the preceding and also past previous scanning line information.

A combination between the above two sets of scanning line information is preset as shown in Table 5.

TABLE 5

| past scanning line information | past previous information | black (0) | white (1) | black (0) | white (1) |
|---|---|---|---|---|---|
| | preceding information | black (0) | black (0) | white (1) | white (1) |
| binary-quantizing level | | 0.2 | 0.5 | 0.5 | 0.8 |

In FIG. 11, when the information read from the storage circuit 12 for storing said two sets of scanning line information is black "0" and black "0", the binary-quantizing level control circuit 13 delivers the slice level signal preset by 20% to the comparator 11 (negative terminal) so as to wait for the succeeding information. Similarly, if the read information is white "1" and black "0", the slice level is set by 50%, whereas if it is white "1" and white "1", the slice level is set by 80% for the preparation of the next scanning line information.

That is to say, as illustrated in FIG. 17A, the slice level (dashed-dotted line) varies so that the precise binary-quantized signal of the original image information(see FIG. 17B).

When the effect of the embodiment shown in FIG. 14A where only the preceding scanning line information is utilized is compared with those of FIG. 17A where both the preceeding and past previous scanning line information are utilized, the voltage difference between the sampling points (black point) for determining the binary-quantization and the slice level (dashed-dotted line) can be set greater than that of FIG. 14A, resulting in the stability of the operation. Consequently, more higher scanning operation can be realized (even when the scanning time periods are $\tau/2$, and $\tau/3$, the precise past record correction can be accomplished).

It is obvious from the above-described preferred embodiment that a more improvement may be realized in the past record correction effects by utilizing a plurality of scanning line information as the past scanning line information.

In general, even if the number of the scanning lines is increased until a specific range influenced by the transition time of the image sensor, the substantially same correction effect may be achieved.

When a plurality of scanning line information is utilized, the quantizing level (slice level) may be controlled by the preceding scanning line information, while the relative gain may be controlled by the past previous scanning line information.

Furthermore, the previous preferred embodiments employed the binary-quantizing or binary-encoding level, but may utilize the multi-level quantization.

If the multi-level quantization is employed, for instance, an A/D-converter for multi-leveled inputs and a memory capable of storing the multi-leveled input data. Either the quantizing level or the relative gain is changed in combination with precise control for the half tone information during the past record correction.

As previously described, the more precise correction can be achieved by introducing correction by the multi-leveled information, as compared with the binary-quantizing correction.

In addition, as apparent from the foregoing descriptions, there are typically control methods for the quantizing-level in that the image signal level is varied with keeping the slice level constant (so-called amplification control of the image signal) and the slice level is varied without adjusting the image signal, and the combined these two methods.

In the previous preferred embodiments, the digital signal transmission system was introduced, but the analog signal transmission system may be utilized. In the later system, after the output level of the photoelectric conversion output signal is controlled and then is conducted to a modulator so that the substantially same advantage as in the digital transmission system may be achieved.

Although the foregoing has been a description and illustration of specific embodiments of the invention, various modifications and changes thereto can be made by persons skilled in the art without departing from the scope and spirit of the invention as defined by the following claims.

What is claimed is:

1. A past record reading apparatus including an optical device wherein an original document is illuminated by a light source, and light reflected from the original document is collected via a lens onto photosensitive elements, and an image sensor wherein said photosensitive elements are arranged in at least one line, a main scanning operation being performed by electronically switching photoelectric conversion outputs derived from said photosensitive elements and a sub-scanning operation being performed by relatively moving either said original document or said optical device; said past record reading apparatus comprising:
  a first quantizing means for quantizing a photoelectric conversion output derived from said image sensor;
  a memory means for successively storing scanning line information which is output from said first quantizing means every other scanning line;
  a second quantizing means for further quantizing said scanning line information output from said first quantizing means; and,
  a comparing means for comparing scanning line information stored in said memory means with scanning line information which has been obtained after said scanning line information was stored in said memory means, wherein a quantizing level of said second quantizing means is controlled in accordance with a result of said comparison by said comparing means.

2. An apparatus as claimed in claim 1, wherein a photosensitive element is employed whose electromotive force or resistance or amount of charged electron flow is varied in response to an amount of incident light.

3. An apparatus as claimed in claim 1, wherein said first quantizing means converts said photoelectric conversion output into a corresponding digital signal by an A/D converter after amplifying said photoelectric conversion output derived from said photosensitive elements.

4. An apparatus as claimed in claim 1, wherein said memory means stores a plurality of scanning line information.

5. An apparatus as claimed in claim 1, wherein said scanning line information output from said first quantizing means is input into said comparing means and simultaneously stored in said memory means.

6. An apparatus as claimed in claim 1, wherein a multi-leveled signal output is obtained by employing a controlled quantizing level.

7. A past record reading apparatus including an optical device wherein an original document is illuminated by a light source, and light reflected from the original document is collected via a lens onto photosensitive elements, and an image sensor wherein said photosensitive elements are arranged in at least one line, main scanning operation being performed by electronically switching photoelectric conversion outputs derived from said photosensitive elements and a sub-scanning operation being performed by relatively moving either said original document or said optical device; said past record reading apparatus comprising;
  a first quantizing means for quantizing a photoelectric conversion output derived from said image sensor;
  a memory means for successively storing scanning line information which is output from said first quantizing means every other scanning line;
  a second quantizing means for further quantizing said scanning line information output from said first quantizing means; and
  a comparing means for comparing scanning line information stored in said memory means with scanning line information which has been obtained after said scanning line information was stored in said memory means, wherein a quantizing level of said first quantizing means is controlled in accordance with a result of said comparison by said comparing means.

8. An apparatus as claimed in claim 7, wherein a photosensitive element is employed whose electromotive force or resistance or amount of charged electron flow is varied in response to an amount of incident light.

9. An apparatus as claimed in claim 7, wherein said first quantizing means converts said photoelectric conversion output into a corresponding digital signal by an A/D converter after amplifying said photoelectric conversion output derived from said photosensitive elements.

10. An apparatus as claimed in claim 7, wherein said memory means stores a plurality of scanning line information.

11. An apparatus as claimed in claim 7, wherein said scanning line information output from said first quantizing means is input into said comparing means and simultaneously stored into said memory means.

12. An apparatus as claimed in claim 7, wherein a multi-leveled signal output is obtained by employing a controlled quantizing level.

13. An apparatus as claimed in claim 7, wherein said comparing means performs a comparison by calculating variations between a present scanning line information and a past scanning line information.

14. A past record reading apparatus including an optical device wherein an original document is illuminated by a light source, and light reflected from the original document is collected via a lens onto photosensitive elements, and an image sensor wherein said photosensitive elements are arranged in at least one line, main scanning operation being performed by electronically switching photoelectric conversion outputs derived from said photosensitive elements and a sub-scanning operation being performed by relatively moving either said original document or said optical device; said past record reading apparatus comprising;
  a quantizing means for quantizing a photoelectric conversion output derived from said image sensor;
  a memory means for successively storing scanning line information output from said quantizing means every other scanning line; and
  a means for controlling either a quantizing level of said quantizing means, or an output level of said photoelectric conversion output in accordance with quantizing information stored in said memory means.

15. An apparatus as claimed in claim 14, wherein a photosensitive element is employed whose electromotive force or resistance or amount of charged electron flow is varied in response to an amount of incident light.

16. An apparatus as claimed in claim 14, wherein said memory means stores a plurality of scanning line information.

17. An apparatus as claimed in claim 14, wherein a gain control circuit for controlling an output level of said photoelectric conversion output is included in an amplifier connected between said image sensor and said quantizing means.

* * * * *